March 19, 1957  C. V. EVERETT ET AL  2,785,929
CONVEYOR

Filed May 11, 1954  3 Sheets-Sheet 2

INVENTORS
CHARLES VERN EVERETT
CLIFFORD THORDSON
BY:
James E. Nilles
ATTORNEY

March 19, 1957  C. V. EVERETT ET AL  2,785,929
CONVEYOR
Filed May 11, 1954  3 Sheets-Sheet 3
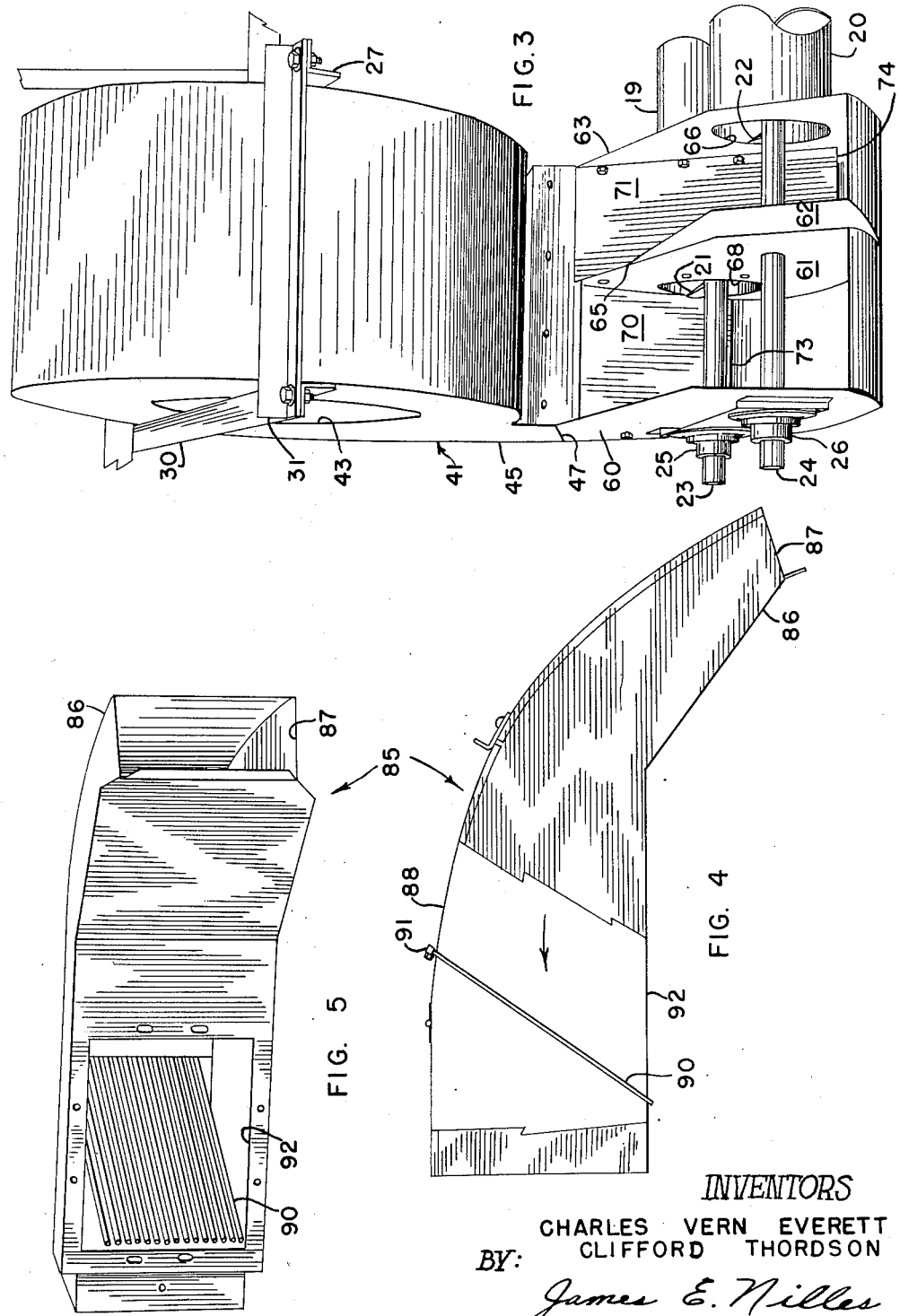
INVENTORS
CHARLES VERN EVERETT
CLIFFORD THORDSON
BY:
James E. Nilles
ATTORNEY though 2,785,929
Patented Mar. 19, 1957

2,785,929
CONVEYOR

Charles Vern Everett and Clifford Thordson, Racine, Wis., assignors to Massey-Harris-Ferguson Inc., a corporation of Maryland Application May 11, 1954, Serial No. 428,894

3 Claims. (Cl. 302—23)

This invention relates to conveyors and finds particular utility in a harvester for conveying a fragile crop, such as peanuts, from various parts of the machine and delivering them in an efficient manner to other portions of the machine.

It is a general object of this invention to provide an improved air conveyor for crop treating machines for conveying fragile crops from various parts of the machine to other locations on the harvester.

It is a more specific object of this invention to provide an improved air-conveyor for a combine, having a common source of air pressure in the form of a blower, which receives crop material from two separate sources on the combine and delivers the separate crop materials to different locations on the combine for subsequent operation thereon.

It is still a more specific object of this invention to provide a conveyor of the above type which is adapted to receive the fragile crop in a very effective portion of the air stream so as to virtually eliminate damage to the crop.

It is another object of this invention to provide a novel receiving chamber for an air-conveyor which receives crop material from two separate sources and causes the efficient delivery of the separate crops with a minimum of damage to the crops.

Other objects and advantages of this invention will become more apparent as this disclosure progresses, reference being had to the accompanying drawings, in which:

Figure 3 is a perspective view, on an enlarged scale, taken from the rear of the machine, of the blower with the cover removed from the receiving chamber.

Figure 4 is an elevational view, on a further enlarged scale, of the comb cleaning device for the "clean crop" elevator, with a portion of the side wall removed for clarity.

Figure 5 is a perspective view of the cleaner and separator shown in Figure 4, taken from the bottom side of the cleaner and with the crop discharge funnel removed.

Figure 1:
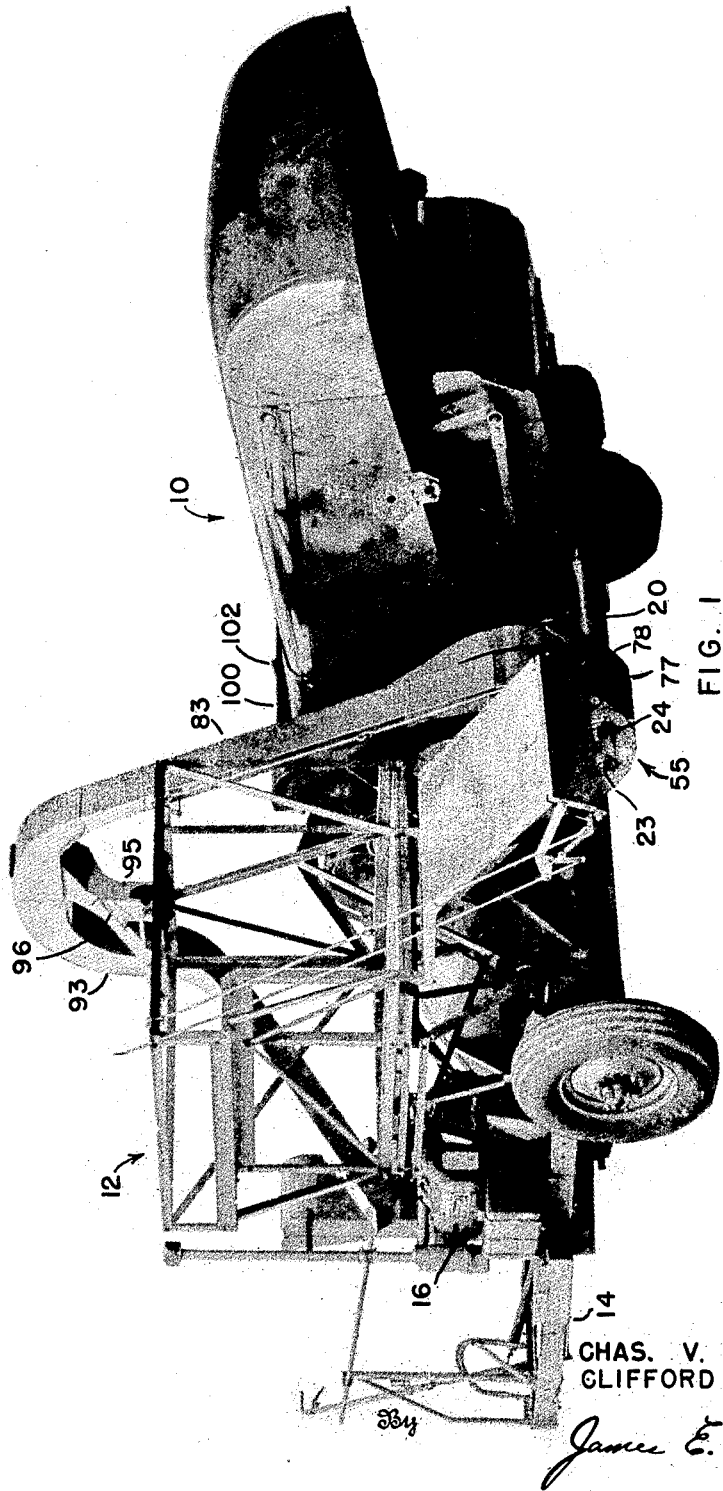
Figure 1 is a general perspective view of a combine incorporating the invention, taken from the left-rear side of the machine.

Referring more particularly to the drawings, Figure 1 shows a pull-type harvester-thresher 10 having a bagging platform 12 supported thereon by suitable angle-iron framework. A hitch portion 14 is adapted to be attached to a tractive vehicle for earth traversing movement. In some instances the harvester-thresher, or combine, receives power for operating its various parts from a power-take-shaft of the tractive vehicle. In the embodiment shown, however, a separate power plant 16, in the form of an internal combustion engine, is secured to the main frame of the combine. Power is supplied from the power plant 16 to various parts of the machine in the conventional and well known manner.

The crop that is harvested is threshed and divided within the body of the machine by conventional straw-walkers, sieves and screens, into two separate masses, i. e., "clean grain" which is delivered to the tank or bagger and "tailings" which are returned in many instances, to the threshing and/or separating mechanisms for further cleaning.

The clean crop and the tailings are collected in separate troughs located in the bottom of the machine and which extend transversely of the machine in relation to the direction of travel.

Shown in Figures 1 and 3, are auger housings 19, 20 which are in communication with the "clean crop" trough and the "tailings" trough respectively. Auger conveyors 21, 22 are rotatably and drivingly mounted within the housings 19, 20 by means of shafts 23, 24 suitably mounted in bearings 25, 26 at one end and by similar bearings (not shown) on the other side of the machine.

Blower

Figure 2:
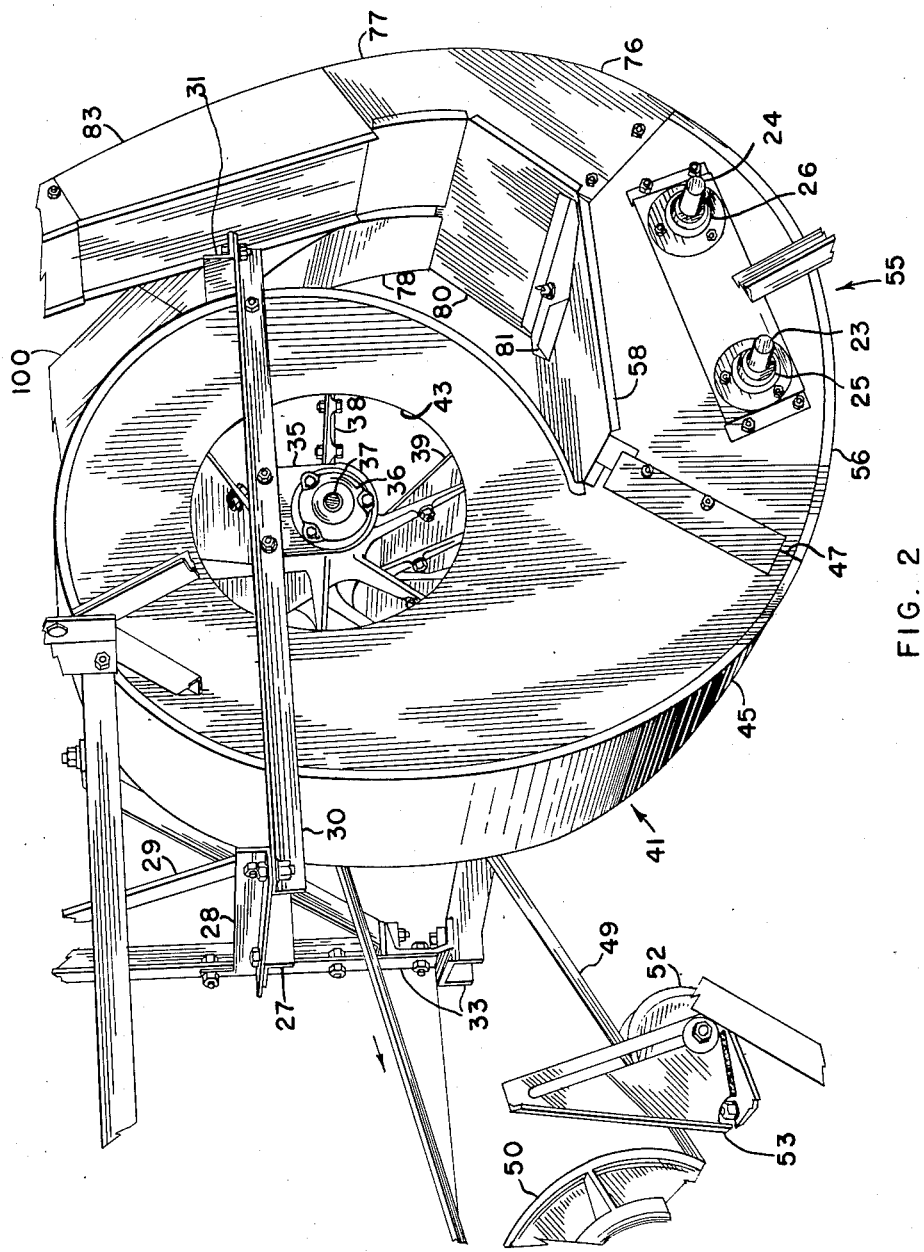
Figure 2 is a perspective view of the blower, on an enlarged scale, showing only portions of its supporting frame structure.

As best shown in Figure 2, angle iron braces 27, 28, 29, 30 and 31 are rigidly secured to the main framework 33 of the machine. Plate members 35 (only one shown) are secured to braces 27 and 30 and each support the bearings 36. Rotatably mounted in bearings 36 is the fan shaft 37 on which is secured the spiders 38 to which are bolted the paddle-like fan blades 39.

The circular shaped fan housing 41 surrounds the fan and is secured to and within the braces 27, 28, 30 and 31. An air inlet opening 43 is provided in each side wall of the housing 41. The lower portion 45 of housing 41 is enlarged and has a discharge opening 47 arranged to discharge the air in a tangential direction. The air so discharged reaches a considerable velocity at this point and is of maximum force at the outer, or peripheral side of the housing.

The blower shaft 37 has a sheave (not shown) at its inner end which is driven by the V-belt 49. A driving pulley 50 over which is trained belt 49, is driven by power derived from power plant 16. The conventional idler pulley 52 is adjustably mounted on the frame portion 53 of the combine to keep belt 49 taut.

Receiving chamber

A receiving chamber 55 is secured to portion 45 of housing 41 and is in communication with the discharge opening 47 of housing 41. The lower side 56 of chamber 55 forms a smooth curve with the peripheral side of housing 41. A cover plate 58 forms the top of chamber 55 and is removable for inspection and cleaning purposes. The chamber 55 is divided into two separate receiving compartments formed by side walls 60, 61, 62 and 63. Side walls 61 and 62 are secured together at their forward edge, as at 65, and diverge at their rearward, or delivery, side. Thus the two separate compartments within chamber 55 receives the air under pressure from a common opening 47 and as the air passes through chamber 55 it is separated into two streams and discharged separately.

The auger housing 20 is attached to side wall 63 and auger 22 discharges into the tailings compartment through opening 66. The shaft 24, however, extends through the chamber 55 and is supported in bearing 26 as previously described. There is thus no bearing support for shaft 24 to impede the flow of crop material into the tailings compartment.

Auger housing 19 extends through the tailings compartment and auger 21 discharges the crop into the "clean crop" compartment through inlet opening 68 in wall 61. Shaft 23 extends through the chamber 55 and is supported in bearing as described.

Baffle plates 70, 71 are secured within the "clean crop" and "tailings" compartments, respectively, and have discharge edges 73, 74 which are positioned beneath inlet openings 68 and 66, and slightly to the rear of a vertical centerline through these openings. The baffles serve to concentrate the flow of air at the curved bottom side 56 of chamber 55. The augers 21, 22 deliver the fragile crop, such as peanuts, into their respective compartments and the crop drops directly into the air streams at a point in the air stream where the velocity is greatest. The crop is immediately carried in the air streams, and completely suspended thereby, without being thrown against the walls of the chamber and are discharged along the gentle curve of the smooth surface formed by the outer side 76 of discharge chambers 77, 78. By means of this particular receiving chamber the nuts are placed directly in the moving air stream in a steady and continuous flow. They are immediately and positively picked up by the air stream without hesitation. The chamber is completely closed which assures a definite control of the air, with no air loss, contributing to the efficiency of the system. The relatively narrow path of high velocity air rushing past the openings 66, 68 causes somewhat of a suction in the ends of the tubes 19, 20 and with the baffles 70, 71 so located, eddy currents in chamber 55 have been eliminated and an efficient arrangement provided.

Discharge chambers

Discharge chambers 77, 78 for the clean crop and tailings, respectively, have a common cover member 80 which is also easily removable and held in place, as is cover 58, by plate 81.

The clean crop is elevated by the air, through tubular discharge conveyor 83, to a point above the bagging platform 12. In communication with discharge conveyor tube 83, and secured thereto, is the cleaner and separator device 85 shown in Figures 4 and 5. The lower portion 86 has an opening 87 which is in communication with the discharge conveyor tube 83. The portion 88 enlarges gradually in cross-sectional area, in the direction of flow, in order that the velocity of the air stream, and material carried thereby, diminishes somewhat before striking the cleaning and separating comb 90. Comb 90 comprises a plurality of steel rods spaced apart in parallel relationship and held in place at their upper end by bracket 91 to which they are secured and which in turn is secured to the upper curved surface of separator 85. The comb 90 is positioned at an angle, shown in Figure 4, to the direction of air travel, indicated by the arrow. The peanuts slide downwardly along the rods and are discharged through the opening 92 in the bottom of separator 85. Any foreign matter, such as small parts of vines, that fail to pass through the comb also falls off the lower ends of the rods. The rods are free and unsupported at their lower ends to facilitate the discharge of the crop and trash. The majority of foreign matter in the "clean" crop is sand, in the case where peanuts are harvested, and this sand readily passed through the comb and is discharged through the waste conveyor 93 at a convenient location at the side of the machine.

As shown in Figure 1, a Y-shaped bagging chute 95 is secured to the underside of separator 85 and is in communication with opening 92 therein. A lever 96 controls a baffle within the chute 95 to alternately open or close either arm of the Y-chute 95 depending on which arm is being used to fill a bag attached thereto. Another discharge conveyor tube 100 is attached to discharge chamber 78 and conveys the tailings carried by the air upwardly and forwardly and then transversely across the width of the machine above the threshing portion thereof. A comb 102 (Figure 1), similar to comb 90 is disposed within conveyor tube 100 in a position similar to that of comb 90. The tailings are directed downwardly by comb 102 through an opening in discharge tube 100 directly beneath comb 102 and drop into the separating mechanism for recleaning. A portion of the tailings, such as chaff and sand, go through comb 102 and are blown out of the end of discharge tube 100 at the right side of the machine.

In practice, an auger had been found effective to convey fragile crops, without damage thereto, in a horizontal direction. However, to elevate fragile crops by means of augers or other devices where the nuts are in contact with moving parts of the conveyor, is unsatisfactory because the crop material tends to pack due to the action of gravity tending to cause the nuts, etc., to accumulate towards the bottom of the conveyor.

With the conveying means above described, however, a uniform and gentle delivery is assured and damage to the crop has been reduced considerably over conventional conveying means.

Having thus shown and described this invention, what is desired to be secured by Letters Patent, is:

1. In a conveyor for fragile material and the like; a blower having a discharge opening; enclosed receiving compartments secured to said blower and in air-receiving communication with said discharge opening, each compartment having side walls and a curved bottom wall; one of said side walls of each compartment having an inlet opening for crop material to be conveyed; a baffle plate secured within each of said compartments and so constructed and arranged as to direct the flow of air from said discharge opening toward said curved bottom wall without at the same time obstructing the normal flow of material from said discharge opening into the said compartment, said plates terminating beneath and rearwardly of the center line of said inlet openings; a discharge conveyor tube secured to and in air-receiving communication with each of said compartments, said tubes emanating from said compartments in a gentle curve.

2. In a receiving chamber for an air-conveyor system for fragile material and the like comprising; an air-receiving end adapted to be in air communication with a source of driven air, a discharge end adapted to be operatively connected with two discharge tubes, substantially vertically positioned side walls defining two compartments, each compartment having a curved bottom wall, a cover removably secured to said compartments, one side wall of each compartment having a material inlet opening positioned above a portion of said bottom wall, a baffle plate secured within each compartment and so constructed and arranged as to direct air from said receiving end along said curved bottom wall and substantially beneath said material inlet openings without at the same time obstructing the normal flow of material from said material inlet openings into the said compartments, said plates terminating beneath and rearwardly of the center line of their respective inlet openings and said tubes emanating from said discharge end in a gentle curve.

3. In a conveyor for fragile material and the like; a blower having a discharge opening; enclosed receiving compartments secured to said blower and in air-receiving communication with said discharge opening, each compartment having side walls and a curved bottom wall; one of said side walls of each compartment having an inlet opening for crop material to be conveyed; a baffle plate secured within each of said compartments and so constructed and arranged as to direct the flow of air from discharge opening toward said curved bottom wall without at the same time obstructing the normal flow of material from said discharge opening into the said compartment, said plates terminating beneath and rearwardly of the center line of said inlet openings, a discharge chamber in air-receiving communication with each of said compartments, said discharge chambers each having a curved outer side which together with said curved bottom walls of said receiving compartments form a smooth, gentle and continuously curved surface.

References Cited in the file of this patent

UNITED STATES PATENTS

| | | |
|---|---|---|
| 843,806 | Groves | Feb. 12, 1907 |
| 1,412,031 | Vallentyne | Apr. 4, 1922 |
| 1,913,676 | Kerr | June 13, 1933 |

FOREIGN PATENTS

| | | |
|---|---|---|
| 66,394 | Sweden | Nov. 20, 1928 |